(12) United States Patent
Nonaka

(10) Patent No.: US 6,487,371 B1
(45) Date of Patent: Nov. 26, 2002

(54) RANGE FINDER DEVICE HAVING MODE FOR REMOVING STEADY LIGHT COMPONENTS AND MODE FOR NOT REMOVING STEADY LIGHT COMPONENTS

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/459,020

(22) Filed: Dec. 10, 1999

(30) Foreign Application Priority Data

Dec. 14, 1998 (JP) .......................................... 10-354535

(51) Int. Cl.[7] .......................... G03B 13/00; G03B 3/00; G03B 3/10; G03B 13/34
(52) U.S. Cl. ............................. 396/98; 396/121; 396/97
(58) Field of Search ............................. 396/89, 96, 98, 396/121, 104

(56) References Cited

U.S. PATENT DOCUMENTS 5,652,926 A  *  7/1997  Saito ........................... 396/98
RE35,652 E  *  11/1997  Nonaka et al. .............. 396/104
5,915,233 A  *  6/1999  Nonaka ........................ 396/89
6,173,122 B1  *  1/2001  Matsumoto et al. ........ 396/104

FOREIGN PATENT DOCUMENTS

JP          55-35399        3/1980
JP          7-167646        7/1995

* cited by examiner

Primary Examiner—Christopher Mahoney
(74) Attorney, Agent, or Firm—Frishauf, Holtz, Goodman & Chick, P.C.

(57) ABSTRACT

A range finder device includes a light projecting section for projecting range finding light onto an object and a light receiving section for monitoring the image pattern of the object. An integrating circuit integrates an output signal from the light receiving section. A steady light component removing section prevents an output signal accompanying steady light irradiated steadily onto the light receiving section from being fed to the integrating circuit. A control section sets a first mode in which the steady light component removing section is operated during range finding or a second mode in which the steady light component removing section is not operated based on an output signal from the light receiving section.

25 Claims, 6 Drawing Sheets

RANGE FINDER DEVICE HAVING MODE FOR REMOVING STEADY LIGHT COMPONENTS AND MODE FOR NOT REMOVING STEADY LIGHT COMPONENTS

BACKGROUND OF THE INVENTION

The present invention relates to a range finder device used in, for example, a camera or the like.

Range finder devices can be classified into two types. In the active mode type, range finding light is projected onto an object and range finding is performed using reflection signal light. The passive mode type uses an image signal of the object. However, because the active mode type uses reflection signal light, it has a drawback in that it is disadvantaged when used on objects with low reflectance or which are at a considerable distance. The passive mode has a drawback in that it is unable to perform accurate range finding in dark scenes in which a picture signal is difficult to obtain or on flat objects having little variation in density.

In Jpn. Pat. Appln. KOKAI Publication Nos. 55-35399, 7-167646, and the like, there is disclosed a method in which range finding is performed using the two above-described modes in combination according to the environment surrounding the object.

By switching between the active mode and passive mode according to the environment surrounding the object, in this way, examples of cameras which can focus correctly for any scene have hitherto both been proposed and manufactured.

However, the above described technology amounts to no more than simply providing both modes side by side and uses a simple structure in which one of these two modes is chosen according to the object. Accordingly, in this type of structure, the space required for the two devices to be mounted together is wasted. Moreover, the wasteful provision of sensors and circuits is a factor in causing the costs to be increased. Further, time is often wasted as both range finding results must be compared in order to decide which mode to employ.

In particular, when the above described range finding modes are used in a camera, after the release operation is performed, if time is required to choose one of the two modes, then the camera ends up acting as a long release time lag camera which is unable to track the movement of the object. For example, even if the expression of a model was excellent at the moment the release button was operated, the expression may have changed during the time taken for the range finding. Accordingly, although the photographer had intended to record a fleeting moment, all that remains in the photograph is often an empty reminder of what the happy memory may have been. Accurate range finding is important, but it is also important to consider these types of photo opportunities in a camera, which is essentially a device for enabling the user to capture the instant that he or she intended to photograph.

BRIEF SUMMARY OF THE INVENTION

Accordingly, an object of the present invention is to provide a range finder device which does away with difficulty to photograph objects, which is effective both cost-wise and space-wise and which has a shortened time lag.

In order to achieve the above objects, the first aspect of the present invention is a range finder device comprising: a light projecting section for projecting range finding light onto an object; a light receiving section for monitoring image patterns of the object; an integrating circuit for integrating an output signal from the light receiving section; a steady light component removing section for preventing an output signal accompanying steady light irradiated steadily onto the light receiving section from being fed to the integrating circuit; and a control section for setting, during range finding, a first mode in which the steady light component removing section is operated or a second mode in which the steady light component removing section is not operated, based on an output signal from the light receiving section.

Further, the second aspect of the present invention is a range finder device comprising: a light projecting section for projecting range finding light onto an object; a light receiving section onto which reflection signal light from the object is irradiated and which monitors image patterns of the object based on the reflection signal light; an integrating circuit for integrating an output signal from the light receiving section; a steady light component removing section for preventing an output signal accompanying steady light irradiated steadily onto the light receiving section from being fed to the integrating circuit; a first determining section for determining a spot configuration of the reflection light signal; a second determining section for determining a contrast of an image pattern of the object; and a control section for setting a first mode in which the steady light component removing section is operated or a second mode in which the steady light component removing section is not operated, based on the determination results of at least one of the determination by the first determining section and the determination by the second determining section.

Further, the third aspect of the present invention is a range finder device comprising: a light projecting section for projecting range finding light onto an object; a light receiving section for monitoring image patterns of the object; an integrating circuit for integrating an output signal from the light receiving section; a first steady light component removing section for preventing an output signal accompanying steady light irradiated steadily onto the light receiving section from being fed to the integrating circuit; and a second steady light component removing section for further removing steady light components from an output signal from the first steady light component removing section.

Further, the fourth aspect of the present invention is a range finder device comprising: a light projecting section for projecting range finding light onto an object; a light receiving section for receiving reflection signal light from the object; an integrating circuit for integrating an output from the light receiving section; a steady light component removing section for preventing a signal based on light irradiated steadily onto the light receiving section from being input to the integrating circuit; a determining section for determining a spot configuration of the reflection signal light or a contrast of an image incident onto the light receiving section according to the result of a first range finding step in which a preliminary range finding operation is performed accompanying the control of the light projecting section, without the steady light component removing section being operated; and a control section for determining, based on determination results by the determining section, whether to perform a second range finding step subsequent to the first range finding step or to perform a steady light component removing operation in the second range finding step.

Further, the fifth aspect of the present invention is a range finder device comprising: a light projecting section for projecting range finding light onto an object; a light receiving section for receiving reflection signal light from the object; an integrating circuit for integrating an output from the light receiving section; a steady light component removing section for preventing a signal based on light irradiated steadily onto the light receiving section from being input to the integrating circuit; a determining section for determining a spot configuration of the reflection signal light or a contrast of an image incident onto the light receiving section according to the result of a first range finding step in which a preliminary range finding operation is performed accompanying the control of the light projecting section, with the steady light component removing section being operated; and a control section for determining, based on determination results by the determining section, whether or not to perform a second range finding step subsequent to the first range finding step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be explained below in detail with reference to the figures.

Figure 1:
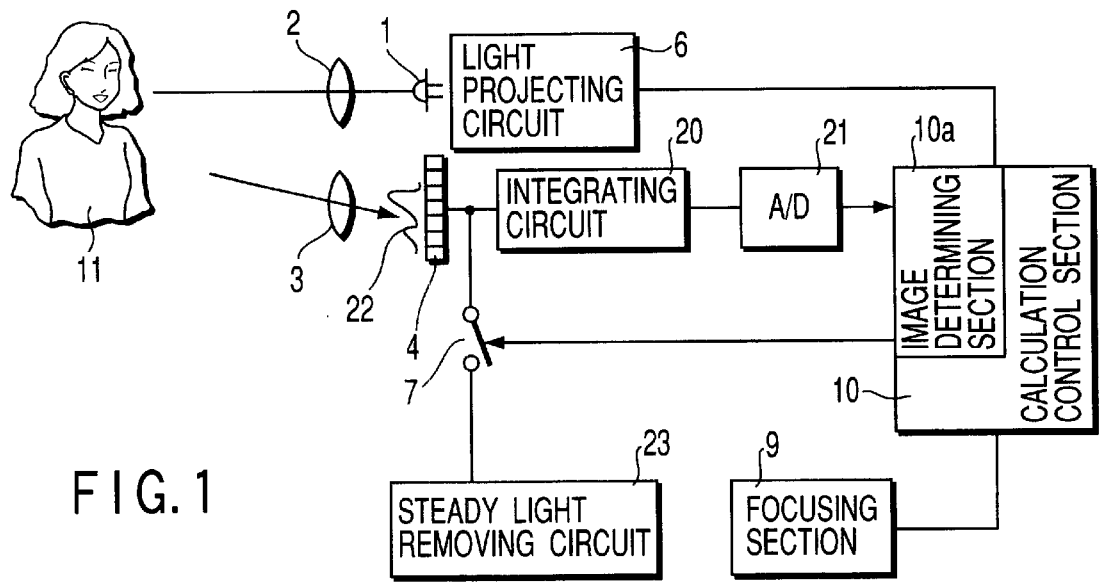
FIG. 1 is a conceptual view of a range finder device in which the present invention is applied.

FIG. 1 is a conceptual view of a range finder device in which the present invention is applied. The light projecting means for projecting range finding light comprises a lens 2 and a light emitting diode 1. A light projecting circuit 6 provides current to and drives the light emitting diode 1. Signal light reflected from an object 11 is irradiated onto a sensor array 4 via a light receiving lens 3. The light receiving lens 3 and the sensor array 4 form a light receiving means. An image 22 of the object is formed on the sensor array 4 according to variations in the density of the brightness of the object due to the reflection signal light as well as to sunlight and artificial light illuminating the object. Each sensor of the sensor array 4 outputs a current signal according to the amount of light illuminating that sensor, which amount of light corresponds to the contrast of the object 22. An integrating circuit 20, functioning as integrating means, integrates the current signal and converts it into a voltage signal.

Note that when light is projected by light projecting means which comprises the lens 2 and the light emitting diode 1, and reflection signal light is irradiated onto the sensor array 4, because the image signal at this time is considered to be caused by noise, the output of the sensors corresponding to this image signal should be removed. Normally, this type of noise is removed by the steady light removing circuit 23 (steady light component removing means). The projection signal light is pulse light, while the image signal current is a steadily flowing current. The steady light removing circuit 23 uses this difference (the difference in the frequency characteristic) to remove the noise. When a calculation control section 10, functioning as the control means, sends a control signal to close a switch 7 and operate the steady light removing circuit 23, the noise is removed and only the reflection signal light for range finding is fed to the integrating circuit 20.

After the output from the integrating circuit 20 undergoes A/D conversion by the A/D conversion means 21, it is fetched by the calculation control section 10 as digital data. The calculation control section 10, which is formed from a one-chip computer or the like, is provided with an image determining section 10a. The calculation control section 10 determines the position of the image and calculates the distance by digital calculation. The calculation control section 10 determines the distance to the object using triangulation theory from the position of the projection light lens and the position of the reflection signal light, and controls a focusing section 9 (focusing means) which includes a driving actuator and a focusing lens for performing focusing.

Figure 2A:
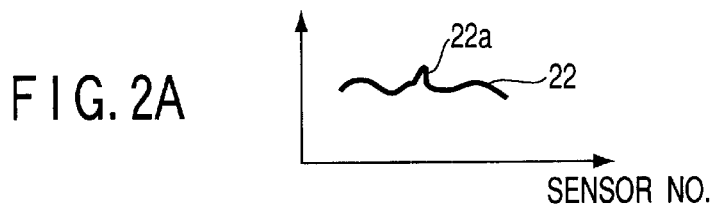
FIGS. 2A, 2B, and 2C are diagrams showing states of output signals from sensor array 4.
Figure 2B:
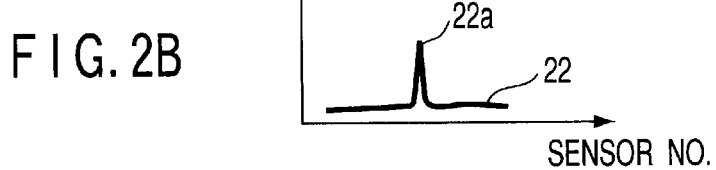
Figure 2C:
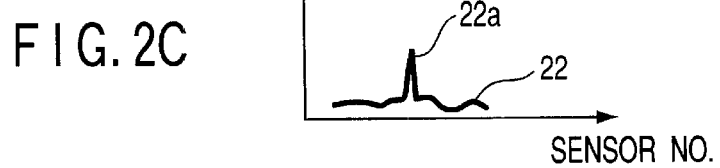

FIGS. 2A to 2C show states of output signals from the sensor array 4 obtained in this way. FIG. 2A shows a state in which the object image 22 is too bright and no substantial differentiation can be made between the object image 22 and the reflection signal light 22a. At this time, if the steady light removing operation is performed, the signal from the object image 22 is removed, as in FIG. 2B, and the reflection signal light 22a becomes clear. However, if the distance to the object is short and the reflection signal light is substantial, or if the scene is dark and the image signal is small, then the signal light position can be clearly determined even without the steady light removing operation being performed, as in FIG. 2C. When the output from the sensor array is used in this way in the active AF mode using signal light projection, then often the steady light removing operation is unnecessary depending on the circumstances.

In cases such as when the image signal is strong and the signal light is weak because the distance to the object is far, it is unnecessary to employ the active AF mode and range finding may be performed using the image signal.

Note that, although not illustrated, it is possible to provide a further light receiving lens 3 and sensor array 4 and perform triangulation range finding using the difference in the positions of the image signals. Alternatively, it is also possible to link the focusing section 9 (focusing means) with the light receiving lens and sensor array, obtain the distance therebetween, and then perform focusing on a high contrast region. This is known as contrast mode AF.

In consideration of the above, in the present invention, in addition to increasing performance by the combined use of active and passive modes, the time required to perform range finding is shortened by not performing the operation to remove steady light in the active mode when the conditions are appropriate.

(First embodiment)

Figures 3, 4:
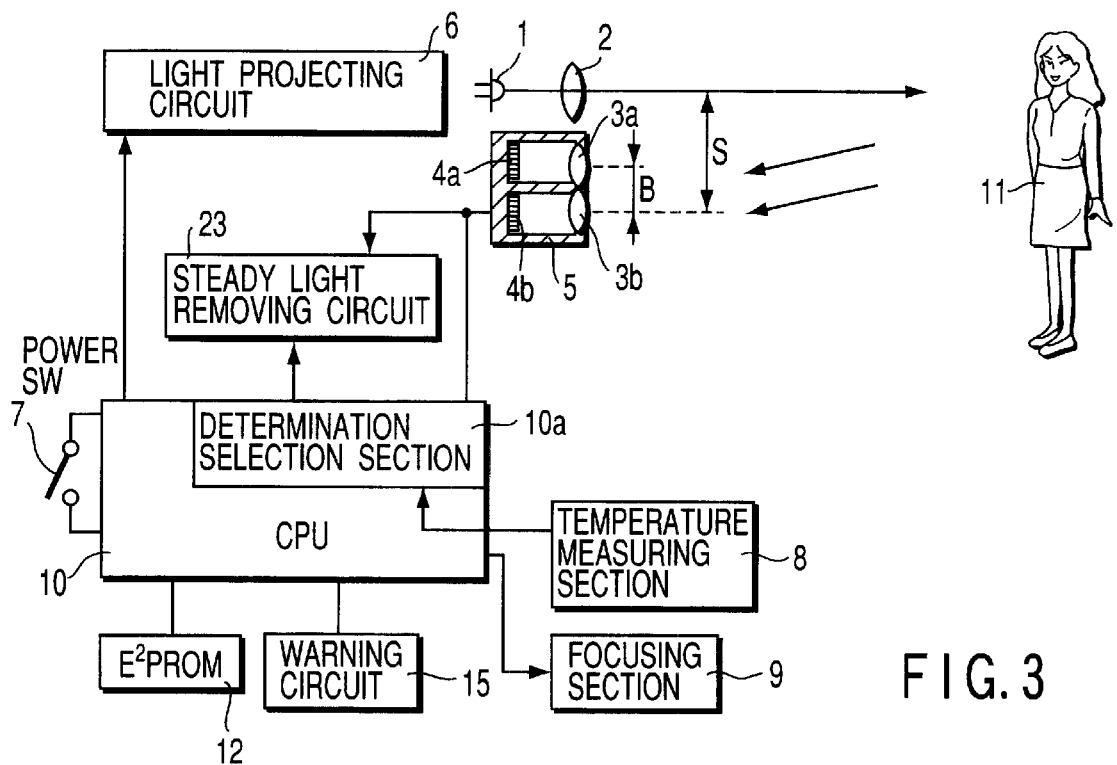
FIG. 3 is a diagram showing a structure of a first embodiment of the present invention.
FIG. 4 is a diagram explaining active AF mode and passive AF mode range finding principles.

FIG. 3 shows a structure of the first embodiment of the present invention. A light projecting circuit 6 is controlled by a calculation control section (CPU) 10 which comprises an one-chip computer or the like. Based on this control, light is emitted by causing current to flow into an active AF infrared emitting diode (IRED) 1 which projects range finding light onto an object 11. A light projecting lens 2 has the function of converging light from the IRED 1 onto the object 11.

In contrast, the passive AF module 5 packages lens sections 3a and 3b and sensor array sections 4a and 4b. In the passive AF mode, an image signal from the object 11 is obtained by each sensor array 4a and 4b via each of the lens sections 3a and 3b, and the displacement in the image position caused by parallax is obtained by triangulation. In the active AF mode, the position of the reflection signal light is obtained using the light receiving lens 3b and the sensor array 4b of the passive AF module 5 as a light receiving means.

In a range finder device capable of switching between active AF mode and passive AF mode in this way, the use of, for example, active AF for objects without contrast, and passive AF for scenes where no signal light is returned, enables range finding to be performed for various scenes without problems. The CPU 10 controls both these range finding modes and selects the correct result after determining the range finding result from each range finding mode in the determination selection section 10a. At the same time, a result which appears to be incorrect can be corrected by comparing the two results and compensating for the incorrect result. Further, as was described above, the determination of whether or not to perform the steady light removing operation is made by the determination selection section 10a and the circuit so controlled.

When the above embodiment is applied to the AF of a camera, a power switch 7 for supplying power, and a focusing section (focusing means) 9 for focusing on the object 11 are provided, and the determining and control thereof are performed by the CPU 10. In addition, a temperature measuring section (temperature measuring means) 8 for monitoring environmental changes is provided, so that even in a scene photographed, for example, in a low temperature environment like a ski resort, or in a high temperature/high humidity environment like at the beach, displacement in the range finding results caused by the temperature can be compensated and correct focusing can be achieved. Further, if some type of irregularity occurs in the camera, a warning is generated by a warning circuit 15. Moreover, various data required to operate the camera is stored in an EEPROM 12.

The principles of the above two range finding modes will be explained below with reference made to FIG. 4. When light is projected from the IRED 1 in the active AF mode, triangulation range finding is performed using the distance (the base length) S between the light projecting lenses. For example, when finding the range of an object located at the distance L2, because the reflection signal light is incident at a position x away from the optical axis of the light receiving lens, by determining the incident position x on the sensor array 4b, the distance to the object can be determined. In this case, if the distance to the object is taken as L and the focal length is taken as f, the relationship $x = S \cdot f / L$ applies and this formula may be used.

On the other hand, in the passive AF mode, the distance (the base length) B between the lenses 3a and 3b disposed at the front face of the two sensor arrays 4a and 4b, and the distance L to the object have the following relationships with x in the figure: $x = B \cdot f / L$. In this formula, f is the focal length of the lens. x is the amount of the relative displacement in image signals and indicates the amount of relative displacement between 11a and 11b which are the images of the object 11 focused on the sensor arrays 4a and 4b. When the image on the lens 3a/sensor 4a side is on the lens optical axis, then if the image on the lens 3b/sensor array 4b side is displaced from the optical axis by the amount x, the distance L1 is determined by modifying the above formula thus: $L1 = B \cdot f / x$.

As explained above, by determining the position x of the reflection signal light on the sensor array in the active AF mode, and by determining the amount x of the relative displacement between the two images 11a and 11b in the passive AF mode, the range to the object can be found.

Figure 5:
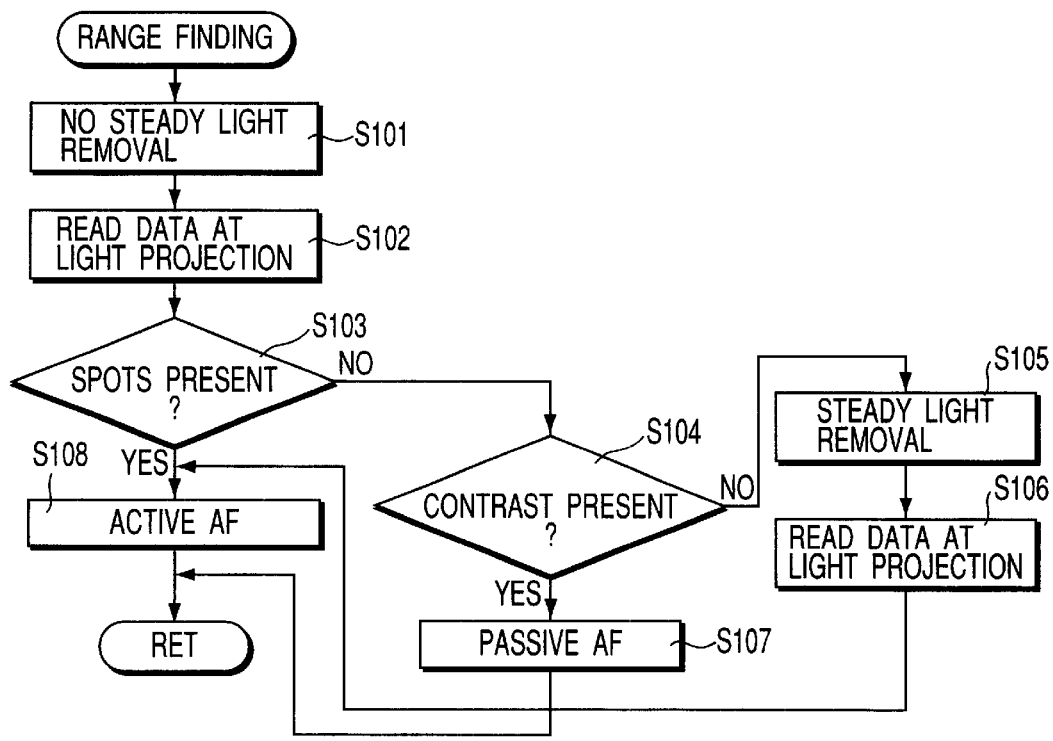
FIG. 5 is a diagram showing a range finding operation sequence according to the present embodiment.

In the first embodiment, by adding a steady light removing circuit 23 capable of controlling the steady light removing operation as described above to a range finding device of this type, a range finding sequence such as that shown in FIG. 5 can be achieved. Firstly, in step S101, the operation of the above steady light removing circuit 23 is prohibited. In step S102 light is projected from the IRED 1 and the data obtained from the sensor at that time is read.

In step S103, a determination is made from the sensor data as to whether or not spots are present. If the spot configuration of the reflection signal light can be recognized, then sufficient spot positioning can be accurately determined, even in a scene such as that indicated by FIG. 2C, namely, a dark scene without contrast, for range finding to be performed using the above described active AF range finding principle (step S108). In this case, the advantage is that the time taken for the range finding is short as the range finding is completed without performing passive AF.

Further, if the determination is made in step S103 that the spot configuration cannot be determined, the routine proceeds to step S104 and a determination is made as to whether or not contrast is present. If the contrast can be recognized, then the range finding may be performed using the above described passive AF principle (step S107). Because the data is only read once this time as well, the advantage is that time taken for the range finding is short.

If, however, there are neither spots nor contrast present, the steady light removing circuit 23 is operated and removal of the steady light is performed (step S105). The data from the light projection is read again (step S106) to change the state obtained from that indicated by FIG. 2A to that indicated in FIG. 2B. Range finding is then performed using the active AF mode as the S/N ratio of the image signal is increased.

In this case, the light projecting operation, data reading, and the like of the range finding are performed twice, however, in a large proportion of scenes, the determination in step S103 or step S104 is affirmative. Accordingly, because the range finding can be completed by either the active AF or the passive AF alone, extremely rapid focusing is possible. Moreover, in the active and passive modes, because the range finding in a scene which is the specialty of a particular mode is dealt with using that mode, the likelihood of erroneous range finding can be kept to a minimum and difficult to focus objects can be done away with.

(Second embodiment)

Figure 6:
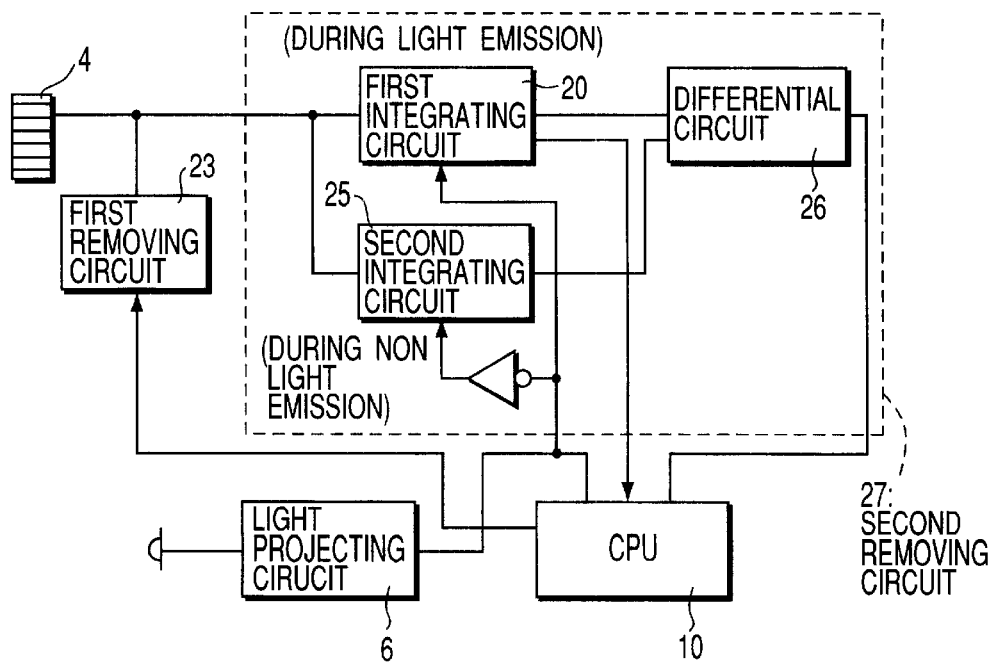
FIG. 6 is a diagram showing a structure of a second embodiment of the present invention.

FIG. 6 shows a structure of the second embodiment of the present invention. The second embodiment is characterized in that two steady light removing circuits are provided to further improve the steady light removal performance. This allows high accuracy active AF with a better S/N ratio to be achieved. Namely, a first removing circuit 23 is provided to separate normal light and signal light which is simply pulse light according to their frequency characteristics. In order to further divide into two and integrate the sensor output which has already had the steady light thereof removed to a certain extent by the first removing circuit 23, a second removing circuit 27, structured so as to have a combination of two integrating means, namely, first and second integrating means 20 and 25, is provided. The first integrating means 20 performs integration synchronously with the light emission from the IRED 1, while the second integrating means 25 performs integration only for the time same time $t_{INT}$ as the first integrating means when light is not being emitted from the IRED 1.

Namely, one of the outputs of the two integrating means 20 and 25 contains the reflection signal light of the IRED 1, the other output does not contain the reflection signal light component of the IRED 1. Accordingly, the output from the differential circuit 26 which takes the difference between these two circuits contains only the reflection signal component.

In the second embodiment, even if the first removing circuit 23 is unable to sufficiently remove the steady light because of the limitations of its circuit format, by using the first removing circuit 23 together with the second removing circuit 27 formed from the first and second integrating circuits 20 and 25, and from the differential circuit (the differential means) 26, the reflection signal light component can be reliably fetched. Moreover, the second embodiment functions as a passive AF if neither the first or second removing circuits are operated.

Figure 7:
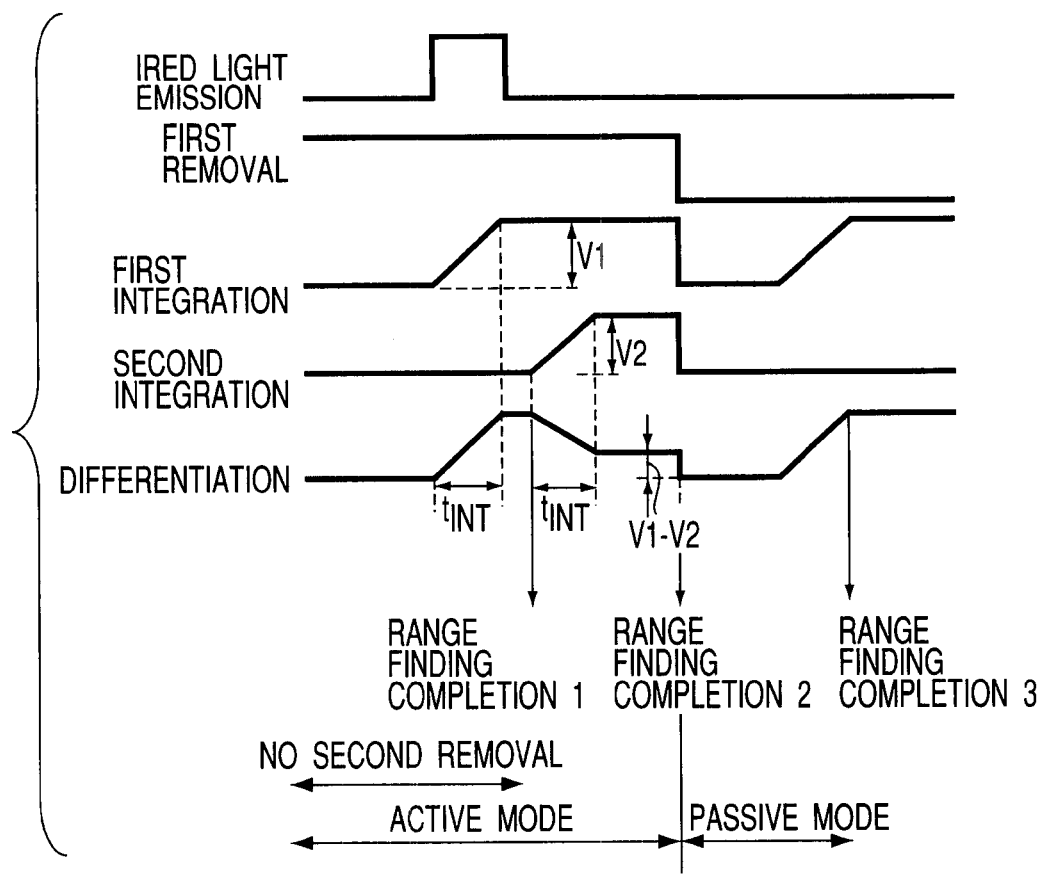
FIG. 7 is a timing chart showing an operation of the second embodiment.

FIG. 7 is a timing chart showing an operation of the second embodiment. This figure shows a division into the active mode in the first half and the passive mode in the second half by the ON/OFF operation of the first removing circuit 23, and a further division of the first half into two portions depending on the presence or absence of IRED light emission.

In the active mode in the first half, an integrating voltage V1 which accompanies an IRED light emission, and an integrating voltage V2 which does not accompany an IRED light emission are shown. When V1 is large and V2 is small, it is possible to detect the reflection signal light without taking the differentiation as described above. In cases like this, range finding is performed using the signal in its existing state (range finding completion 1, in FIG. 7).

However, when, in a bright scene, sufficient steady light is not removed, then, when the spot configuration of the reflection signal light cannot be obtained, integration without using light projection (integration amount V2) is performed. The difference (V1−V2) between the integration without light projection and the result of the integration with light projection is then determined by the differential circuit 26. This difference (V1−V2) is then input into the CPU 10 and, if the spot configuration can be determined, range finding using the active AF principle may be performed on the basis thereof. If range finding has been possible by this, then range finding is completed at this point (range finding completion 2, in FIG. 7).

If, however, the spot configuration cannot be obtained by this, the scene is unsuitable for active AF and a switch is made to the passive AF mode to perform the range finding. If, for example, the object has an extremely low reflectance or is at a considerable distance, then the reflection signal light does not come back. In this type of scene, the operation of the first removing circuit 23 is turned off and range finding and integration using the image signal are performed in the passive AF mode (range finding completion 3, in FIG. 7).

If, at this time, a sufficient contrast can be obtained in the image signal, then passive range finding can be performed. However, if there is insufficient contrast, then it is considered that the object in the scene has low contrast and is at a considerable distance which is unsuited for both active and passive AF, and the focus is set for, for example, 10 meters. Generally, when both active and passive AF are used together, range finding is definitely performed as far as the range finding completion 3 and a determination is made as to which mode has the highest reliability. However, in the present invention, at the moment a predetermined reliability is determined in the spot configuration or the like partway through the process, range finding is completed. Therefore, general objects in scenes which are not too far way or not too bright can be rapidly focused. Moreover, even in the absence of conditions such as these, by further removing steady light, changing to passive mode, and reading the second and third data, even difficult scenes can be dealt with.

Figure 8:
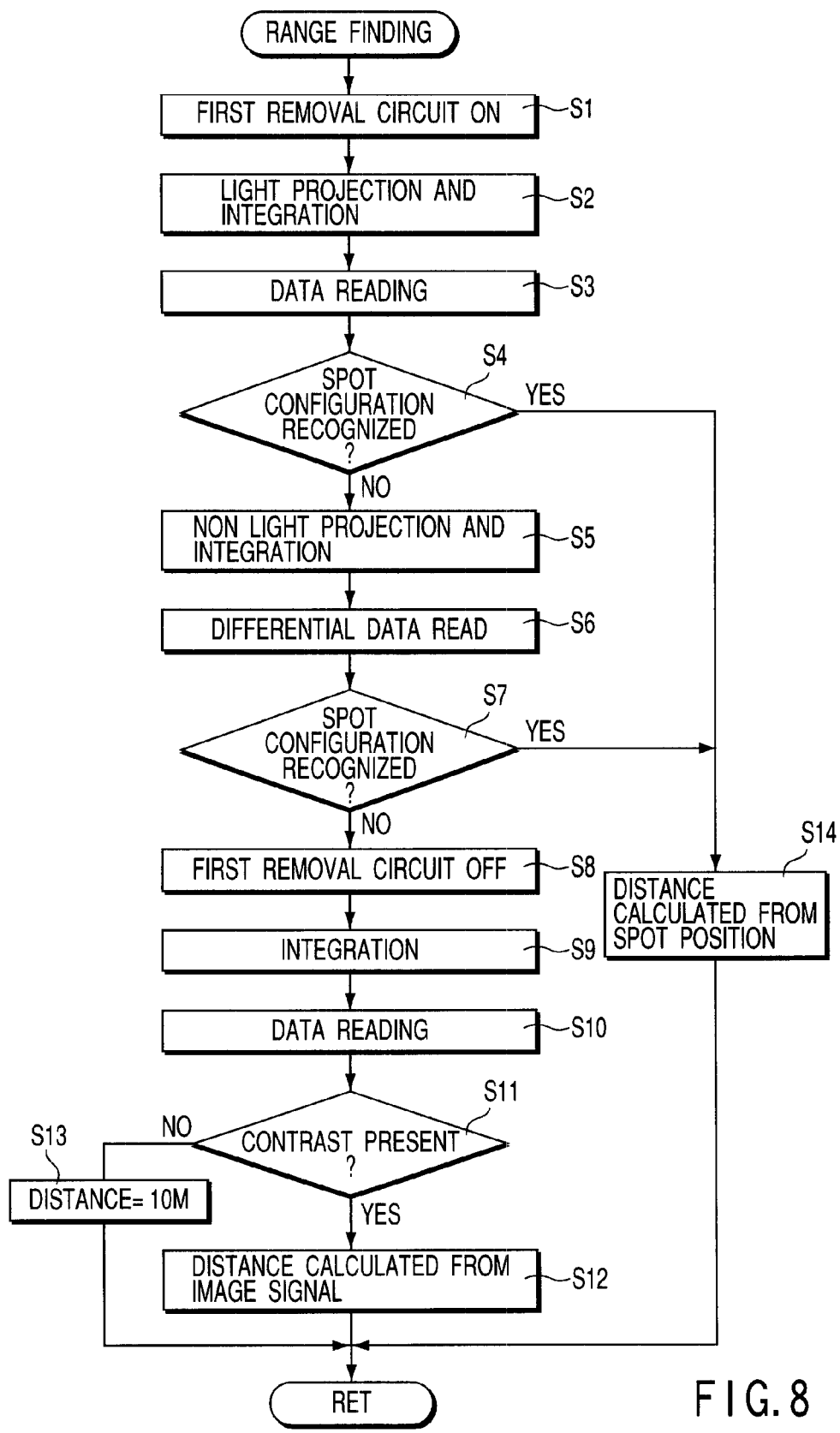
FIG. 8 is a flow chart showing an operation of the second embodiment.

Steps S1 to S14 in the flow chart shown in FIG. 8 show an operation of the above second embodiment. Firstly, the first removing circuit 23 is turned on (step S1), and the light projection and integrating operation are performed (step S2). Next, data reading is performed (step S3), and a determination is made as to whether or not a spot configuration can be recognized (step S4). If the determination is affirmative, the range to the object is calculated based on the spot position (step S14) and the routine proceeds to return.

If the determination in step S4 is negative, the integration operation is performed without light projection and the integration result is obtained (step S5). Next, the differential data from the integration results with and without light projection is read (step S6), and a determination is made as to whether or not a spot configuration can be recognized (step S7). If the determination is affirmative, the routine proceeds to step S14 and the range to the object is calculated based on the spot position. Thereafter, the routine proceeds to return.

If the determination in step S7 is negative, the first removing circuit 23 is turned off (step S8), and then the integration operation is performed (step S9). The data from this is then read (step S10), and a determination is made as to whether or not contrast is present (step S11). If the determination here is affirmative, the range to the object is calculated based on the image signal (step S12). If the determination here is negative, the focus is set at 10 meters (step S13) and the routine proceeds to return.

Figure 9:
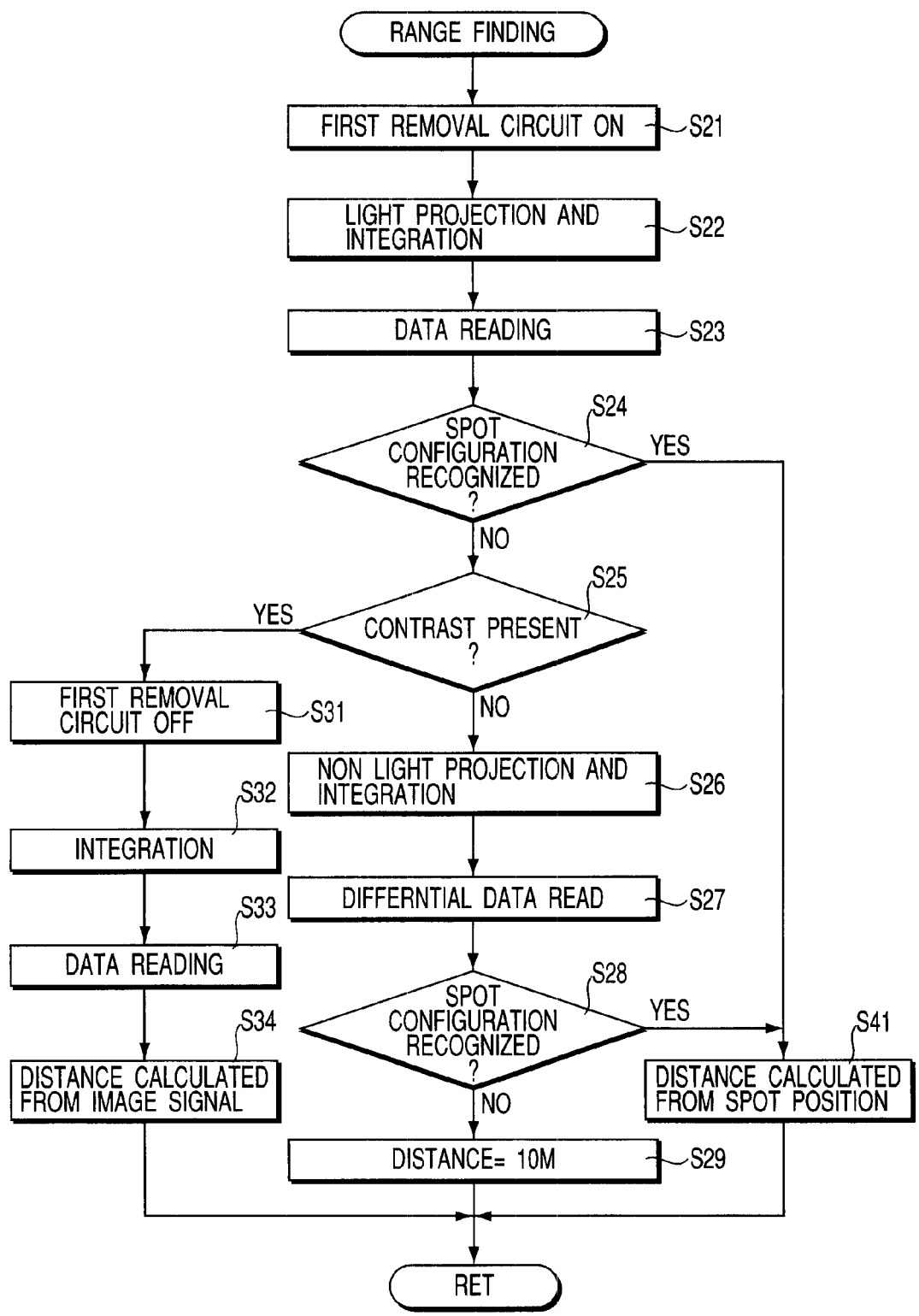
FIG. 9 is a flow chart for explaining a modified example of the second embodiment.

A modified example of the above second embodiment will be explained below with reference made to FIG. 9. In this modified example, firstly, the first removing circuit 23 is turned on (step S21), and then the light projection and integrating operation are performed (step S22). Next, the data from this is read (step S23), and a determination is made by the CPU 10 as to whether or not a predetermined spot configuration is obtained (step S24) and whether or not contrast is present (step S25), based on the sensor data obtained from this operation. The processing described below is then performed according to the results from these determinations. For example, if a predetermined spot configuration is obtained, active AF is executed based on the spot positioning (step S41).

If, however, a predetermined spot configuration is not obtained but contrast is obtained, steps S31 to S34 are executed. Namely, passive AF, which specializes in scenes with contrast, is executed and the range is calculated from the image signal.

If a predetermined spot configuration is not obtained and neither is contrast obtained, then, in steps S26 and S27, steady light removal is performed. A verification is then made that the spot configuration is clearer (step S28) and, either the range is calculated from the spot positioning (step S41), or, if the spot configuration still cannot be recognized, the focus is set to 10 meters (step S29).

In this way, range finding is completed in the minimum number of steps by branching from step S24 to step S41, or, if this is not possible, in step S25 and beyond, the passive or active mode is already set and range finding appropriate to one or the other is performed. Accordingly, an extremely fast AF operation most appropriate for a particular scene can be achieved.

Figure 10:
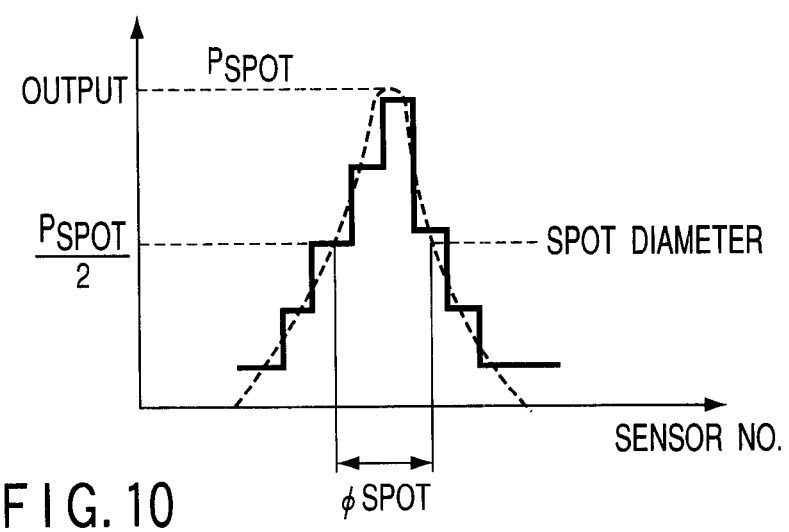
FIG. 10 is a diagram for explaining a reflection signal light spot determination detection method.

Note that, in this case, the technique for the spot determination detection of the reflection signal light is extremely important, however, this may be achieved by the following. For example, as shown in FIG. 10, the sensor data is read and, using the peak value of the maximum point ($P_{SPOT}$), the spot diameter $\phi_{SPOT}$ from the sensor position at which the value is half that of the $P_{SPOT}$ is obtained. If this corresponds to the SPOT diameter from the projected IRED light, then a determination is made that the reflection signal light is obtained. In the above modified example, because a determination is made as to whether to next perform active AF or passive AF based on the result of the preliminary range finding as far as step S23, there is no need to perform active AF and passive AF in series, making faster and more accurate range finding possible.

In this way, according to the above described first and second embodiments and the modified example thereof, a range finder device is provided in which difficult to focus objects are done away with by the effective operation of active AF and passive AF, and an AF device is provided with a reduced time lag which prevents photo opportunities from being lost.

As explained above, according to the embodiments of the present invention, a range finder device can be provided which does away with difficulty to photograph objects and which is effective both cost-wise and space-wise and which has a shortened time lag. Moreover, active AF with a high level of accuracy and an excellent S/N ratio can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A range finder device comprising:
   a light projecting section for projecting range finding light onto an object;
   a light receiving section for monitoring image patterns of the object;
   an integrating circuit for integrating an output signal from the light receiving section;
   a steady light component removing section for preventing an output signal accompanying steady light irradiated steadily onto the light receiving section from being fed to the integrating circuit; and
   a control section for setting, during range finding, a first mode in which the steady light component removing section is operated with range finding light being projected or a second mode in which the steady light component removing section is not operated, based on an output signal from the light receiving section.

2. The range finder device according to claim 1, wherein, when the second mode is set, active mode range finding or passive mode range finding is performed according to the condition of the object.

3. A range finder device comprising:
   a light projecting section for projecting range finding light onto an object;
   a light receiving section onto which reflection signal light from the object is irradiated and which monitors image patterns based on the reflection signal light;
   an integrating circuit for integrating an output signal from the light receiving section;
   a steady light component removing section for preventing an output signal accompanying steady light irradiated steadily onto the light receiving section from being fed to the integrating circuit;
   a first determining section for determining a spot configuration of the reflection light signal;
   a second determining section for determining a contrast of an image pattern of the object; and
   a control section for setting a first mode in which the steady light component removing section is operated with range finding light being projected or a second mode in which the steady light component removing section is not operated, based on the determination results of at least one of the determination by the first determining section and the determination by the second determining section.

4. The range finder device according to claim 3, wherein, when the control section determines that the first determining section is unable to recognize a spot configuration of the reflection light signal and determines that the second determining section is unable to recognize contrast in an image pattern of the object, the control section sets the first mode.

5. The range finder device according to claim 3, wherein, when the control section determines that the first determining section is able to recognize a spot configuration of the reflection light signal or determines that the second determining section is able to recognize contrast in an image pattern of the object, the control section sets the second mode.

6. A range finder device comprising:
   a light projecting section for projecting range finding light onto an object;
   a light receiving section for monitoring image patterns of the object;
   an integrating circuit for integrating an output signal from the light receiving section;
   a first steady light component removing section for preventing an output signal accompanying steady light irradiated steadily onto the light receiving section from being fed to the integrating circuit; and
   a second steady light component removing section for further removing steady light components from an output signal from the first steady light component removing section.

7. The range finder device according to claim 6, wherein the second steady light component removing section comprises:
- a first integrating circuit for placing the light projecting section in a light projecting state and integrating an output signal from the light receiving section;
- a second integrating circuit for placing the light projecting section in a non-light projecting state and integrating an output signal from the light receiving section; and
- a differential calculation section for determining a difference between an integration result by the first integrating circuit and an integration result by the second integrating circuit.

8. The range finder device according to claim 7, in which a spot configuration determining section is provided for determining a spot configuration of reflection signal light from the object based on an output signal from the differential calculation section,
- wherein, when a determination is made that the spot configuration determining section is able to recognize a spot configuration, range finding is performed by calculating a position of the reflected signal light incident onto the light receiving section.

9. The range finder device according to claim 8, further comprising a prohibition processing section for prohibiting the second integrating circuit from operating when a determination is made that the spot configuration determining section is able to recognize a spot configuration.

10. The range finder device according to claim 7, in which a spot configuration determining section is provided for determining a spot configuration of reflection signal light from the object based on an output signal from the differential calculation section,
- wherein, when a determination is made that the spot configuration determining section is unable to recognize a spot configuration, range finding is performed using an image signal of the object.

11. A range finder device comprising:
- a light projecting section for projecting range finding light onto an object;
- a light receiving section for receiving reflection signal light from the object;
- an integrating circuit for integrating an output from the light receiving section;
- a steady light component removing section for preventing a signal based on light irradiated steadily onto the light receiving section from being input to the integrating circuit;
- a determining section for determining a spot configuration of the reflection signal light or a contrast of an image incident onto the light receiving section according to the result of a first range finding step in which a preliminary range finding operation is performed accompanying the control of the light projecting section, without the steady light component removing section being operated; and
- a control section for determining, based on determination results by the determining section, whether to perform a second range finding step subsequent to the first range finding step or to perform a steady light component removing operation in the second range finding step.

12. A range finder device comprising:
- a light projecting section for projecting range finding light onto an object;
- a light receiving section for receiving reflection signal light from the object;
- an integrating circuit for integrating an output from the light receiving section;
- a steady light component removing section for preventing a signal based on light irradiated steadily onto the light receiving section from being input to the integrating circuit;
- a determining section for determining a spot configuration of the reflection signal light or a contrast of an image incident onto the light receiving section according to the result of a first range finding step in which a preliminary range finding operation is performed accompanying the control of the light projecting section, with the steady light component removing section being operated; and
- a control section for determining, based on determination results by the determining section, whether or not to perform a second range finding step subsequent to the first range finding step.

13. The range finder device according to claim 12, further comprising a determining section for determining whether or not to perform range finding in which the steady light component removing section is operated, according to the result when the steady light component removing section has been operated.

14. A range finder device comprising:
- light projecting means for projecting range finding light onto an object;
- light receiving means for monitoring an image pattern of the object;
- integrating means for integrating an output signal from the light receiving means;
- steady light component removing means for preventing an output signal accompanying steady light irradiated steadily onto the light receiving means from being fed to the integrating means; and
- control means for setting, during range finding, a first mode in which the steady light component removing means is operated or a second mode in which the steady light component removing means is not operated, based on an output signal from the light receiving means.

15. A range finder device comprising:
- light projecting means for projecting range finding light onto an object;
- light receiving means onto which reflection signal light from the object is irradiated and which monitors image patterns of the object based on the reflection signal light;
- an integrating circuit for integrating an output signal from the light receiving means;
- steady light component removing means for preventing an output signal accompanying steady light irradiated steadily onto the light receiving means from being fed to the integrating means;
- first determining means for determining a spot configuration of the reflection light signal;
- second determining means for determining a contrast of an image pattern of the object; and
- control means for setting a first mode in which the steady light component removing means is operated or a second mode in which the steady light component removing means is not operated, based on the determination results of at least one of the determination by the first determining means and the determination by the second determining means.

16. A range finder device comprising:

light projecting means for projecting range finding light onto an object;

light receiving means for monitoring image patterns of the object;

integrating means for integrating an output signal from the light receiving means;

first steady light component removing means for preventing an output signal accompanying steady light irradiated steadily onto the light receiving means from being fed to the integrating means; and second steady light component removing means for further removing steady light components from an output signal from the first steady light component removing means.

17. A range finder device comprising:

light projecting means for projecting range finding light onto an object;

light receiving means for receiving reflection signal light from the object;

integrating means for integrating an output from the light receiving means;

steady light component removing means for preventing a signal based on light irradiated steadily onto the light receiving means from being input to the integrating means;

determining means for determining a spot configuration of the reflection signal light or a contrast of an image incident onto the light receiving means according to the result of a first range finding step in which a preliminary range finding operation is performed accompanying the control of the light projecting means without the steady light component removing means being operated; and control means for determining, based on determination results by the determining means, whether to perform a second range finding step subsequent to the first range finding step or to perform a steady light component removing operation in the second range finding step.

18. A range finder device comprising:

light projecting means for projecting range finding light onto an object;

light receiving means for receiving reflection signal light from the object;

integrating means for integrating an output from the light receiving means;

steady light component removing means for preventing a signal based on light irradiated steadily onto the light receiving means from being input to the integrating means;

determining means for determining a spot configuration of the reflection signal light or a contrast of an image incident onto the light receiving means according to the result of a first range finding step in which a preliminary range finding operation is performed accompanying the control of the light projecting means, with the steady light component removing means being operated; and control means for determining, based on determination results by the determining means, whether or not to perform a second range finding step subsequent to the first range finding step.

19. A range finder device comprising:

a light projecting section for projecting range finding light onto an object;

a light receiving section for monitoring image patterns of the object;

an integrating circuit for integrating an output signal from the light receiving section;

a steady light component removing section for preventing an output signal accompanying steady light steadily irradiated onto the light receiving section from being fed to the integrating circuit;

a determining section for determining whether or not a spot configuration of a reflected signal light can be recognized in an image pattern monitored by the light receiving section at a time of distance pre-measurement accompanying control by the light projecting section, and a control section for setting, during range finding, a first mode in which the steady light component removing section is operated or a second mode in which the steady light component removing section is not operated, based on determination results of the determining section.

20. The range finder device according to claim 19, wherein when a determination is made by the determining section that the spot configuration can be recognized, an active-type measurement is performed.

21. The range finder device according to claim 20, wherein the active-type distance measurement is performed without accompanying operation of the steady light component removing section.

22. The range finder device according to claim 19, wherein when a determination is made by the determining section that the spot configuration cannot be recognized, a passive-type distance measurement is performed or an active-type distance measurement accompanying operation of the steady light component removing section is performed.

23. The range finder device according to claim 19 further comprising a second determining section for determining a contrast of the image pattern of the object.

24. The range finder device according to claim 23, wherein the control section sets a mode based on determination results of the second determining section when a determination is made by the determining section that the spot configuration cannot be recognized.

25. The range finder device according to claim 24, wherein the control section performs a passive type-distance measurement when a determination is made by the determining section that the contrast of the image pattern can be recognized, and the control section performs an active-type distance measurement accompanying operation of the steady light component removing section when a determination is made by the determining section that the contrast cannot be recognized.

* * * * *